UNITED STATES PATENT OFFICE.

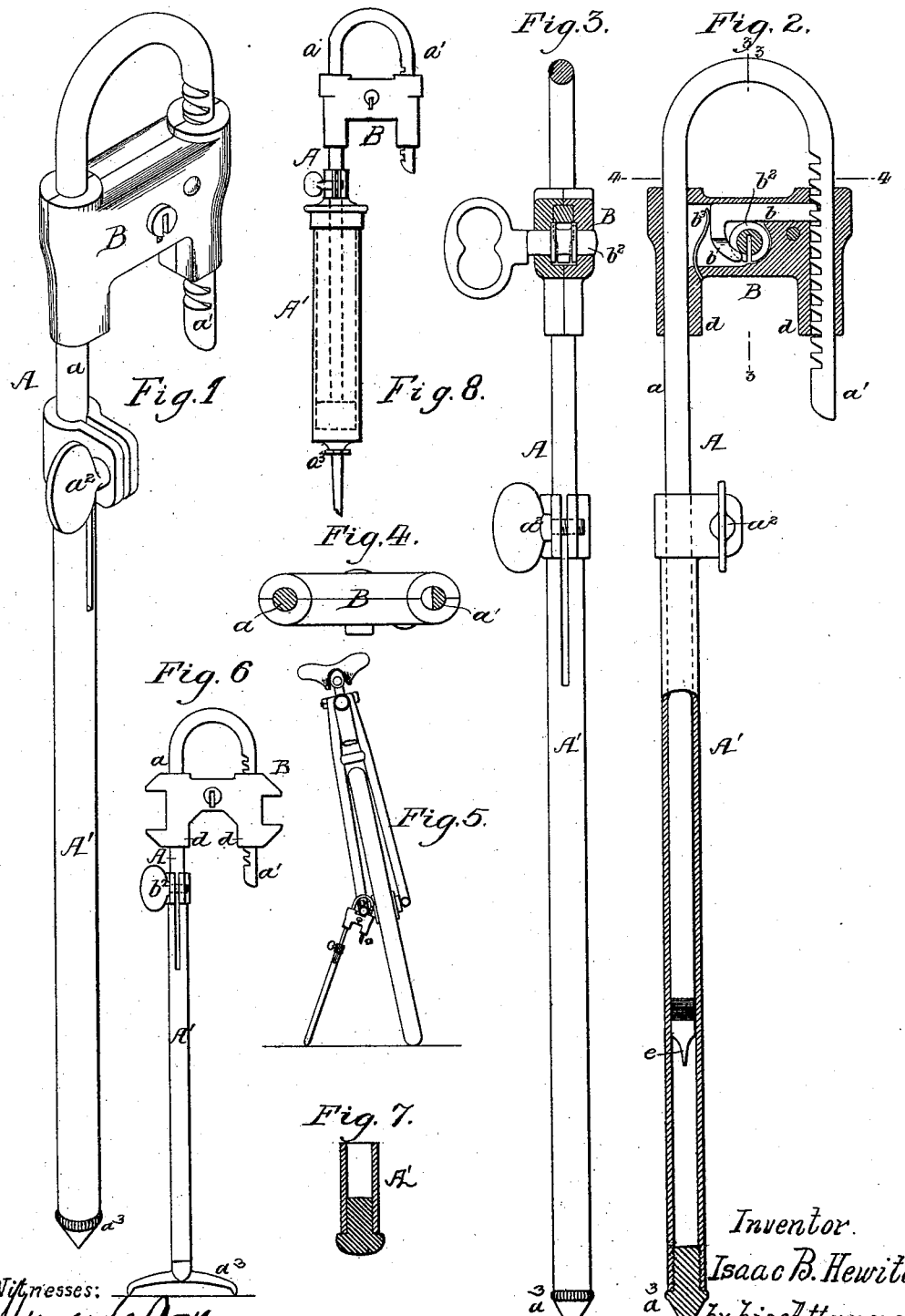

ISAAC B. HEWITT, OF PHILADELPHIA, PENNSYLVANIA.

BICYCLE STAND AND LOCK.

SPECIFICATION forming part of Letters Patent No. 599,607, dated February 22, 1898.

Application filed July 17, 1897. Serial No. 644,874. (No model.)

*To all whom it may concern:*

Be it known that I, ISAAC B. HEWITT, a citizen of the United States, residing in Philadelphia, Pennsylvania, have invented certain Improvements in Bicycle Stands and Locks, of which the following is a specification.

The object of my invention is to provide a lock for bicycles, &c., that can be adjusted to clamp the moving parts thereof; and a further object of the invention is to combine with the lock a stand for supporting the bicycle; and a still further object is to utilize portions of the stand as tools to dispense with the carrying of unnecessary implements.

In the accompanying drawings, Figure 1 is a perspective view of my improved bicycle lock and stand. Fig. 2 is a vertical sectional view. Fig. 3 is a transverse sectional view on the line 3 3, Fig. 2. Fig. 4 is a sectional plan view on the line 4 4, Fig. 2. Fig. 5 is a view showing the lock-stand applied to a bicycle. Fig. 6 is a view of a modification. Fig. 7 is a view showing the substitution of a rubber tip for the point shown in Fig. 2, and Fig. 8 is a view showing the adjustable section in the form of a pump-barrel.

A is a rod looped at one end, forming two sections $a$ $a'$. The section $a'$ has a series of teeth straight on one side and beveled on the opposite side. This section is shorter than the section $a$. Adapted to slide upon the section $a$ is an extension-rod A', split at the upper end and provided with a clamp-screw $a^2$, and on the opposite end of this extension-rod I preferably secure a point $a^3$, although in some instances a rubber tip may be used, as shown in Fig. 7, or a two-armed extension may be used, as shown in Fig. 6, where greater stability is required.

B is the lock-casing, adapted to slip upon both sections $a$ $a'$, and in this lock-casing is a bolt $b$, having teeth at one end, which engage the teeth on the section $a'$. This bolt has a projection $b'$, which is acted upon by the key. $b^2$ is a slotted hub having a groove in which the projection $b'$ rests, so that by inserting the key in this hub and turning the key and hub the bolt will be pushed back out of engagement with the teeth in the section $a'$.

A spring $b^3$, secured to the casing, rests against the bolt and tends to force it into engagement with the teeth, so that by simply withdrawing the bolt by the key and lowering the lock-casing below the section $a'$ of the rod the hooked end of said rod can be passed over the drive-chain of the bicycle, for instance, and one of the side bars of the frame, and by simply forcing the lock-casing up on the rod it will draw the chain to the frame of the bicycle, and as the teeth are in the form of ratchet-teeth the bolt acts as a pawl and retains the lock-casing in the adjusted position, automatically locking the casing to the rod. By this means I can so couple the lock-stand to the bicycle as to prevent movement of the chain, thus locking the wheels. By adjusting the extension the rod will form a rest for the bicycle, so that by inclining the bicycle a trifle to one side it will rest upon the stand and will be supported, as shown in Fig. 5.

When it is not wished to use the device as a stand, but simply as a lock, I may dispense with the extension and may make the section $a$ of the rod shorter, and in some cases the lock can be entirely removed from the two sections of the rod in order to attach it to the device to be locked.

On the end of the section $a$ of the rod I form a screw-driver $e$, and I preferably so shape the lower portion of the lock-casing that the two arms $d$ $d$ of the casing will form the jaws of a wrench, and, as shown in Fig. 6, the projections may extend on each side of the casing to form jaws of wrenches, so that in this instance three different-sized jaws are formed on the casing. By using the extension-rod as the handle of the wrench and the lock-casing as the head I can adjust any of the nuts on an ordinary machine.

In some instances I may use the adjustable section A' as a barrel of an air-pump and the long arm $a$ of the rod as the piston or plunger and suitably pack it, so as to prevent leakage, and in order to couple the barrel to the stem of the bicycle-tire I simply remove the point $a^3$ and screw it either directly onto the stem of the tire or secure it to a section of hose, so that I have not only a combined bicycle stand and lock, but also a universal tool, and I need carry only one implement.

I claim as my invention—

1. The combination in a lock, of the looped rod having two sections, one section having a series of teeth, with a lock-casing adapted to slide upon the sections of the rod, locking mechanism carried by the casing and adapted to engage any one of the teeth of the rod so that the casing can be locked at any point to which it is adjusted, substantially as described.

2. The combination in a lock, of a rod looped to form two sections, one of said sections having a series of teeth straight on one side and beveled on the opposite side, forming ratchet-teeth, with a lock-casing adapted to the sections of the rod, and spring locking mechanism adapted to pass over the teeth when the lock is pushed on the rod and to hold the casing against removal by engaging one or more of the teeth, substantially as described.

3. The combination of the hooked bar having one arm extended to form a stand, the other arm having ratchet-teeth thereon, with a sliding lock-casing adapted to clamp a part of the bicycle to the bar and having a bolt engaging the ratchet-teeth, substantially as described.

4. The combination of the hooked bar A, having an adjustable section A', ratchet-teeth on said bar, a lock-casing adapted to slide on the bar and having a bolt engaging with the teeth, substantially as described.

5. The combination in a combined lock and stand for bicycles, of the hooked bar having a long and a short arm, an adjustable extension on the long arm, a series of ratchet-teeth on the short arm, a lock-casing adapted to slide on both the short and long arms, with a locking-bolt adapted to engage with the teeth on the short arm, means for withdrawing the bolt and a spring for keeping the bolt in contact with the teeth whereby the hooked end of the bar can be slipped over a moving and a stationary part of a bicycle and the lock-casing can be drawn up upon the bar thus securing the stand to the bicycle, substantially as described.

In testimony whereof I have signed my name to this specification in the presence of two subscribing witnesses.

ISAAC B. HEWITT.

Witnesses:
WILL. A. BARR,
JOS. H. KLEIN.